(12) United States Patent
Riski (10) Patent No.: US 11,353,273 B2
(45) Date of Patent: Jun. 7, 2022

(54) HEAT EXCHANGER MODULE AND A HOUSING THEREFOR

(71) Applicant: Valeo North America, Inc., Auburn Hills, MI (US)

(72) Inventor: Roy Riski, Auburn Hills, MI (US)

(73) Assignee: Valeo North America, Inc., Auburn Hills, MI (US)

( * ) Notice: Subject to any disclaimer, the term of this patent is extended or adjusted under 35 U.S.C. 154(b) by 227 days.

(21) Appl. No.: 16/400,458

(22) Filed: May 1, 2019

(65) Prior Publication Data

US 2020/0348090 A1 Nov. 5, 2020

(51) Int. Cl.
  *F28F 9/02* (2006.01)
  *F28F 9/00* (2006.01)
  *B60H 1/00* (2006.01)
  *B01D 35/26* (2006.01)
  *B01D 35/00* (2006.01)
  *F02B 29/04* (2006.01)

(52) U.S. Cl.
  CPC .......... *F28F 9/0246* (2013.01); *B01D 35/005* (2013.01); *B01D 35/26* (2013.01); *B60H 1/00521* (2013.01); *B60H 1/00542* (2013.01); *F02B 29/0456* (2013.01); *F28F 9/001* (2013.01); *F28F 2280/00* (2013.01)

(58) Field of Classification Search
  CPC .. B01D 35/005; B01D 35/26; B60H 1/00514; B60H 1/00521; B60H 1/00528; B60H 1/00571; F28D 1/024; F28F 9/001; F28F 9/002; F28F 9/0246; F28F 19/01; F28F 2250/08
  See application file for complete search history.

(56) References Cited

U.S. PATENT DOCUMENTS

| 5,529,117 A * | 6/1996 | Voss ................ F28F 9/0246 165/144 |
| 7,219,717 B2 * | 5/2007 | Hanafusa ............ F28F 9/027 165/153 |
| 10,048,008 B1 * | 8/2018 | Mounioloux .......... F28D 1/04 |
| 2001/0036779 A1 * | 11/2001 | Schneemann ......... F28F 9/00 440/88 HE |
| 2002/0170707 A1 * | 11/2002 | Shibata ........... B60H 1/00521 165/202 |
| 2003/0141037 A1 * | 7/2003 | Zobel .................. F28F 9/002 165/41 |
| 2007/0000705 A1 * | 1/2007 | Honzek ................ F28F 9/002 180/68.4 |

(Continued)

*Primary Examiner* — Eric S Ruppert
*Assistant Examiner* — Hans R Weiland
(74) *Attorney, Agent, or Firm* — Osha Bergman Watanabe & Burton LLP (57) ABSTRACT

A housing for configuring a compact heat exchanger module includes separate fluid flow conduits integrally formed on at least one wall thereof and connected to at least one inlet and at least one outlet of at least one heat exchanger disposed within the housing. The separate fluid flow conduits configures at least a part of the heat exchange circuit that facilitates passage of fluid cooled/heated by the at least one heat exchanger through at least one region to be cooled/ heated to extract/reject heat there-from/thereto and return heated/cooled fluid back to the at least one heat exchanger for cooling/heating thereof.

14 Claims, 7 Drawing Sheets

(56) References Cited

U.S. PATENT DOCUMENTS

| | | | |
|---|---|---|---|
| 2007/0272397 A1* | 11/2007 | Reyzin | F28D 1/053 165/122 |
| 2009/0236761 A1* | 9/2009 | Gembolis | F28D 1/04 261/5 |
| 2011/0303402 A1* | 12/2011 | Gu | F28F 9/001 165/175 |
| 2016/0245597 A1* | 8/2016 | Meshenky | F28F 9/001 |
| 2017/0102164 A1* | 4/2017 | Giannoni | F28F 9/001 |
| 2018/0128555 A1* | 5/2018 | Kinder | F28F 9/001 |

* cited by examiner

FIG. 7b

HEAT EXCHANGER MODULE AND A HOUSING THEREFOR

FIELD OF THE INVENTION

The present disclosure relates to a fluid processing module, particularly, the present disclosure relates to housing configuring a compact heat exchanger module or a compact fluid filter module for use in vehicles or stationary equipment.

BACKGROUND

Various fluid processing modules, particularly, heat exchangers and fluid filters are configured in vehicles. Examples of heat exchangers configured in a vehicle are chiller for supplying cooled heat exchange fluid for extracting heat from a battery pack of the vehicle or a power electronics module used in the vehicle, particularly electric vehicle or hybrid vehicle, charge air cooler for supplying cooled air to an intake manifold of an engine of the vehicle, condenser and evaporator forming part of a Heating Ventilation and Air Conditioning system of the vehicle and radiator for supplying cooled coolant for extracting heat from the engine of the vehicle or power electronic modules used in the vehicle. Examples of filter modules used in a vehicle are fluid filter module for filtering fluid such as lubricant supplied to regions or parts to be lubricated inside the vehicle and air filter for filtering air before introduction of the air into the Heating Ventilation and Air conditioning system of the vehicle and an air intake manifold of an engine of the vehicle.

Generally, the heat exchanger module, for example, a cooling module is either air cooled or fluid cooled and includes a heat exchanger, a pump, a storage reservoir and plurality of pipes and connector elements. The heat exchanger facilitates heat exchange between a heat exchange fluid, and either air in the case of air cooled heat exchanger module, or water in the case of a water cooled heat exchanger module. In case of an air cooled heat exchanger module, fan elements generate an air flow through the heat exchanger for enhancing performance of the heat exchanger. The pipes facilitate fluid communication between the heat exchanger and a region to be cooled. For example, pipes configure a cooling circuit, and specifically, at least one pipe forms a connection between the region to be cooled and the heat exchanger to supply cooled heat exchange fluid to the region to be cooled and facilitates passage of cooled heat exchange fluid through the region to be cooled for extracting heat there from. At least one separate pipe returns heated heat exchange fluid that is heated by extracting heat from the region to be cooled back to the heat exchanger for cooling thereof to configure at least a part of the cooling circuit cycle referred to as the cooling cycle that repeats to achieve cooling of the region to be cooled. The storage reservoir and the pump facilitate continuous flow of the heat exchanger fluid through the cooling circuit. Similarly, a filtering circuit is configured by replacing the heat exchanger with a filter element. In the case of the filtering circuit, the first pipe delivers particulate laden fluid to the filter element and the second pipes receive and supply fluid filtered by the filter element to the region requiring the filtered fluid.

As the heat exchanger modules such as chillers, charge air coolers, condensers, radiators and the likes are intended for use on vehicles, the heat exchanger modules are required to be compact so that the heat exchanger modules can be conveniently packaged in limited available vehicle space without interfering with operation of adjacent elements. In some cases, the heat exchangers used in other stationary equipment such as battery charging stations are also required to be compact considering space constraints. Further, the conventional heat exchanger modules or filtering modules involve use of flexible connecting pipes for connecting the various elements thereof and routing of the flexible pipes through the limited available spaces of the vehicle, considering the placement of pump and the reservoir is inconvenient. More specifically, considering that the pipes configuring the cooling circuit are required to be in fluid communication with the pump and the storage reservoir for maintaining continuous fluid flow in the pipes, and the pump and the storage reservoir can be located far away due to mounting space limitations, the pipes may be required to be long and may require several bends. Longer pipes with bends, particularly, abrupt, frequent and sharp bends along the length of the pipes may cause pressure losses inside the pipes. Also, due to flexible configuration of the connecting pipes, the energy of the fluid flowing through the pipes may be dissipated in flexing of the flexible pipes that may cause pressure loss inside the pipes. Further, fluid transport via rigid or flexible pipes requiring multiple bends can lead to a large restriction and potential energy losses and the fluid pump has to overcome the excessive restrictions, so a high power pump may be required that is bulky. The pressure loss inside the pipes may necessitate use of bulkier and powerful pumps and larger reservoir that in turn increases size and weight of the heat exchanger module. Further, sometimes the bends may disrupt the fluid flow through the pipes. Furthermore, with use of connectors, issues such as connector compatibility and leakage from a large number of joints may arise, that in turn causes inconvenience in assembly of the heat exchanger module and deteriorates performance and efficiency of the heat exchanger respectively. Still further, the numerous lose pipes with bends and connectors create clutter and renders the conventional heat exchange module unsystematic and aesthetically non-appealing. Further, the loosely held flexible pipes may interfere with the operation of adjacent elements or get in contact with sharp edges or heated surfaces and get damaged. Still further, the heat exchange elements may get heated due to flow of hot exchange fluids there through and cause damage to other adjacent elements when adjacent elements come in contact with the heated heat exchange elements.

SUMMARY OF THE INVENTION

Accordingly, there is a need for a compact heat exchanger module for facilitating easy packaging of the heat exchanger module in limited space of a vehicle and that addresses leakage, pipe routing, connector compatibility, pressure loss and other issues associated with conventional heat exchanger modules that use a combination of rigid and flexible pipes for configuring a heat exchange circuit. Also, there is a need for a compact heat exchanger module that encloses critical elements of the heat exchanger module such as heat exchanger and protects the same against damage from external environment and also protects elements adjacent to the heat exchanger module from damages caused by hot surfaces such as pipes of the conventional heat exchanger module carrying the hot fluid there-through.

An object of the present invention is to provide a compact heat exchanger module that reduces the drawbacks such as leakage, pipe routing, connector compatibility, pressure loss due to bends and flexing of pipes and other issues associated with conventional heat exchanger modules that use flexible pipes for configuring a heat exchange circuit.

Yet another object of the present invention is to provide a compact heat exchanger module that achieves proper utilization of space.

Another object of the present invention is to provide a compact heat exchanger module that can be conveniently assembled while still limiting the dependency on dedicated tools used for configuring connections between elements of conventional heat exchanger modules such as pump and pipes, reservoir and the pipes and other such connections.

Yet another object of the present invention is to provide a compact heat exchanger module that defines an enclosure to protect delicate elements such as pipes, fan elements, pump, storage reservoir and heat exchanger core from harmful environment conditions such as dust and moisture laden environment, the enclosure also protects elements adjacent to the heat exchanger module from damages caused by hot surfaces such as pipes of the heat exchanger module carrying the hot fluid there through.

Still another object of the present invention is to provide a compact heat exchanger module configured with fluid flow conduits that facilitate smooth and unhindered fluid flow there through irrespective of profile of the fluid flow conduits, number and configuration of bends configured along the length of the fluid flow conduits, while still using smaller pump and reservoir.

Another object of the present invention is to provide a compact heat exchanger module configured with fluid flow conduits that provide additional heat transfer surface.

Still another object of the present invention is to provide a compact heat exchanger module that is configured with fluid flow conduits that are systematically disposed away from other adjacent elements, do not interfere with operation of adjacent elements and are held away from any sharp edges or heated surfaces that can cause damage to the heat exchange conduits.

Yet another object of the present invention is to provide a compact heat exchanger module configured with fluid flow conduits, wherein the conduits facilitates passage of fluid cooled by the at least one heat exchanger through more than one region to be cooled for simultaneously extracting heat there from.

Still another object of the present invention is to provide a compact heat exchanger module configured with fluid flow conduits, wherein the conduits facilitates passage of fluid heated by the at least one heat exchanger through more than one region to be heated for simultaneously extracting heat there from.

Yet another object of the present invention is to provide a compact heat exchanger module that can be packaged anywhere in the vehicle or in a stationary use due to compact configuration thereof.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

Housing for a compact heat exchanger module is disclosed in accordance with an embodiment of the present invention. The housing includes separate fluid flow conduits integrally formed on at least one wall thereof and connected to at least one inlet and at least one outlet of at least one heat exchanger disposed within the housing. The separate fluid flow conduits configures at least a part of the heat exchange circuit to receive heat exchange fluid from the at least one heat exchanger and deliver the heat exchange fluid to the at least one heat exchanger.

Generally, the separate fluid flow conduits facilitates passage of heat exchange fluid cooled by the at least one heat exchanger through at least one region to be cooled to extract heat there-from and return heated fluid back to the heat exchanger for cooling thereof.

Specifically, the at least one first fluid flow conduit supplies fluid, that is either one of coolant, refrigerant and lubricant heated by extracting heat from the at least one region to be cooled, that is at least one of, a battery, an electronic Control unit and Engine Control Unit (ECU), an evaporator of a Heating Ventilation and Air Conditioning system and an engine and transmission of a vehicle to the at least one heat exchanger that is at least one of, a chiller, a condenser and a radiator respectively, whereas the at least one second flow conduit separate from the first fluid flow conduit returns fluid cooled in the at least one heat exchanger back to the at least one region to be cooled, the fluid flow conduits configure part of fluid flow circuit of at least one of, a battery, an electronic Control unit and Engine Control Unit cooling system, the Heating Ventilation and Air Conditioning system and an engine cooling system of the vehicle.

In accordance with an embodiment of the present invention, the separate fluid flow conduits facilitates passage of heat exchange fluid heated by the at least one heat exchanger through at least one region to be heated to reject heat there-to and return cooled heat exchange fluid back to the heat exchanger for heating thereof.

Specifically, at least one first fluid flow conduit supplies fluid cooled after rejecting heat to the at least one region to be heated, that is at least one of, the engine and the condenser of the Heating Ventilation and Air Conditioning system of the vehicle to the at least one heat exchanger that is at least one of, a heater and the evaporator respectively, whereas the at least one second flow conduit separate from the first fluid flow conduit returns fluid heated in the at least one heat exchanger back to the at least one region to be heated, the fluid flow conduits configure part of fluid flow circuit of at least one of, an engine cold starting system and the Heating Ventilation and Air Conditioning system of the vehicle.

Generally, the housing is a modular housing such that at least one first housing portion and at least one second housing portion configuring the housing are detachable with respect to each other.

Generally, the fluid flow conduits are formed of metal to provide additional heat transfer surface.

Alternatively, the fluid flow conduits are formed of plastic material.

Further, the fluid flow conduits are configured with auxiliary elements such as flow restrictors and end connectors.

Generally, at least a portion of cross section of at least one fluid flow conduit through which heat exchange fluid flows is outside the walls of the housing.

Alternatively, at least a portion of cross section of at least one fluid flow conduit through which heat exchange fluid flows is inside the walls of the housing.

In accordance with an embodiment of the present invention, the fluid flow conduits are integrally formed on at least one wall of the housing by either one of molding and extrusion process.

Alternatively, the fluid flow conduits are formed on at least one wall of the housing by machining process.

In accordance with an embodiment of the present invention, the fluid flow conduits are straight conduits.

Alternatively, the fluid flow conduits follow at least one of regular and irregular profile.

In accordance with an embodiment of the present invention, the fluid flow conduits optionally includes at least one right angle bend.

Specifically, the at least one heat exchanger is so configured within the housing to facilitate air flow across the at least one heat exchanger. The housing further includes at least one of vents and exhaust air ducting configured on at least one wall thereof for facilitating escape of air entering inside the housing after passing through the at least one heat exchanger.

A compact heat exchanger module, hereinafter referred to as a "module" is disclosed in accordance with an embodiment of the present invention. The "module" includes housing as disclosed above and at least one pump that is connected to and is in fluid communication with at least one of the fluid flow conduits to configure and regulate fluid flow through a heat exchange circuit of which the fluid flow conduits are part of.

Also, the compact heat exchanger module includes a pump housing integrally formed on at least one wall of the housing to receive the at least one pump therein.

Further, the compact heat exchanger module optionally includes at least one storage reservoir formed on at least one wall of the housing, the at least one storage reservoir is connected to and in fluid communication with the fluid flow conduit other than the fluid flow conduit to which the at least one pump housing is connected to.

Generally, at least a portion of the fluid flow conduits are integrally formed on any available surface such as surface of auxiliary elements such as pressurized air flow bottles and storage reservoir received inside the housing.

Still further, the compact heat exchanger module includes at least one fan element received inside the housing that facilitates air flow through the at least one heat exchanger to enhance the heat exchange.

Preferably, at least one of the fluid flow conduits, the storage reservoir and the pump housing are integrally formed on at least one internal wall of the housing.

Furthermore, at least one of fan mounting structure and heat exchanger mounting structure are integrally formed on at least one wall of the housing.

In accordance with an embodiment of the present invention, the storage reservoir further includes a filler element configured thereon that is accessible from outside the housing and that facilitates refilling of the storage reservoir.

A compact fluid processing module includes a housing, separate fluid flow conduits and at least one pump. The housing receives at least one fluid processing element configured with at least one inlet and at least one outlet. The separate fluid flow conduits are integrally formed on at least one wall of the housing and are connected to the at least one inlet and the at least out let of the at least one fluid processing element respectively. The at least one pump is connected to and in fluid communication with at least one of the fluid flow conduits to configure and regulate fluid flow through a fluid processing circuit of which the fluid flow conduits are part of.

Optionally, the compact fluid processing module includes a pump housing integrally formed on at least one wall of the housing to receive at least one pump therein.

Further, the compact fluid processing module optionally includes at least one storage reservoir formed on at least one wall of the housing, the storage reservoir is connected to and in fluid communication with the fluid flow conduit other than the fluid flow conduit to which the at least one pump is connected to.

Generally, the fluid flow conduits are part of the fluid processing circuit that facilitates passage of fluid processed by the at least one fluid processing element through at least one target location and return fluid that again requires processing back to the fluid processing element for processing thereof.

Optionally, the at least one fluid processing element is a filter element that filters lubricant passing there through and the fluid flow conduits are part of a filtering circuit that facilitates supply of particulate laden lubricant to the filter element for filtering thereof and returning filtered lubricant cleaned by the filter element to the at least one target location to be lubricated such as parts of an engine.

BRIEF DESCRIPTION OF THE DRAWINGS

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein.

It must be noted that the figures disclose the invention in a detailed enough way to be implemented, the figures helping to better define the invention if needs be. The invention should however not be limited to the embodiment disclosed in the description.

DETAILED DESCRIPTION

Housing and a compact heat exchanger module with elements thereof such as heat exchanger and fan elements disposed within the housing and at least one of fluid flow conduits, pump housing with pump received therein and storage reservoir integrally configured on internal walls of the housing is disclosed in accordance with an embodiment of the present invention. Although, as per the disclosure made in the present specification, the heat exchanger module for use in a vehicle is used to explain configuration and functioning of a compact fluid processing module configured by the housing of the present invention, however, any other modules, such as for example, filter modules, mixing module and any other fluid processing module that are applicable for use in vehicular and non vehicular applications and that are required to be compact are also within the scope and ambit of the present invention.

Referring to FIG. 1-FIG. 5b, an isometric view of housing 1 in accordance with an embodiment of the present invention is illustrated. The housing 1 includes separate fluid flow conduits 2a and 2b, also referred to as first fluid flow conduit 2a and second fluid flow conduit 2b integrally formed on at least one wall of the housing 1 to define at least a part of a heat exchange circuit.

In accordance with an embodiment of the present invention, the housing 1 has a modular configuration such that at least one first housing portion 1a and at least one second housing portion 1b configuring the housing 1 are detachable to provide access to elements received inside the housing 1. As, detachable engagement means for facilitating assembly and disassembly of the at least one first housing portion 1a with at least one second housing portion 1b is well known therefore such detachable engagement means are not described in details for the sake of brevity of the present document. With such configuration, the maintenance of a heat exchanger module configured by the housing 1 is convenient. Specifically, interior of the housing 1 and the elements received inside the housing 1 are conveniently accessible for service and maintenance, whenever required in spite of being protectively enclosed inside the housing 1.

The housing 1 receives at least one heat exchanger 4, also referred to as heat exchanger or heat exchanger core that is configured with at least one inlet 4a and the at least one outlet 4b for ingress and egress of a heat exchange fluid into and out of the at least one heat exchanger 4 respectively. The heat exchanger can be used for either heating of the fluid or for the cooling of the fluid. The at least one heat exchanger 4 is so configured within the housing 1 to facilitate air flow across the at least one heat exchanger 4. The housing 1 further includes vents 3 configured on at least one wall thereof for facilitating escape of air entering inside the housing 1 after passing through the at least one heat exchanger 4. The fluid flow conduits 2a and 2b can be interchangeably connected to the at least one inlet 4a and the at least one outlet 4b of the at least one heat exchanger 4. In accordance with an embodiment of the present invention, the at least one heat exchanger 4 receives hot heat exchange fluid from either one of the fluid flow conduits 2a and 2b, cools the hot heat exchange fluid and delivers cooled heat exchange fluid to the fluid flow conduit other than the one from which the heat exchange fluid enters the at least one heat exchanger 4. The cooled heat exchange fluid is in turn passed through at least one region to be cooled for extracting heat from the at least one region to be cooled. Alternatively, the at least one heat exchanger 4 receives cold heat exchange fluid from either one of the fluid flow conduits 2a and 2b, heats the cold heat exchange fluid and delivers heated heat exchange fluid to the fluid flow conduit other than the one from which the heat exchange fluid enters the at least one heat exchanger 4. The heated heat exchange fluid in turn is passed through at least one region to be heated for rejecting heat to the at least one region to be heated. In accordance with an embodiment of the present invention, the at least one heat exchanger 4 is a plate type heat exchanger or a tube type heat exchanger. In accordance with another embodiment, the heat exchangers are arranged in series. In accordance with still another embodiment of the present invention, the at least one heat exchanger 4 is disposed in series with at least one fluid processing element such as filter that operates in conjunction with the at least one heat exchanger 4 to provide filtered and either heated or cooled heat exchange fluid depending upon requirement. Such as for example, in case of Exhaust Gas Re-circulation (EGR) the exhaust gas to be re-circulated to the engine is required to be filtered as well as cooled. In such cases, the exhaust gas is passed through the heat exchanger module configured with a cooler and a filter in series. The present invention is not limited to any particular configuration of the heat exchanger, placement and sequence thereof in relation to any other fluid processing unit operating in conjunction with the at least one heat exchanger 4 and disposed within the housing 1. Further, the housing 1 includes separate fluid flow conduits 2a and 2b integrally configured on the walls of the housing 1 and connected to the at least one inlet 4a and the at least one outlet 4b of the at least one heat exchanger 4 respectively.

Figure 6:
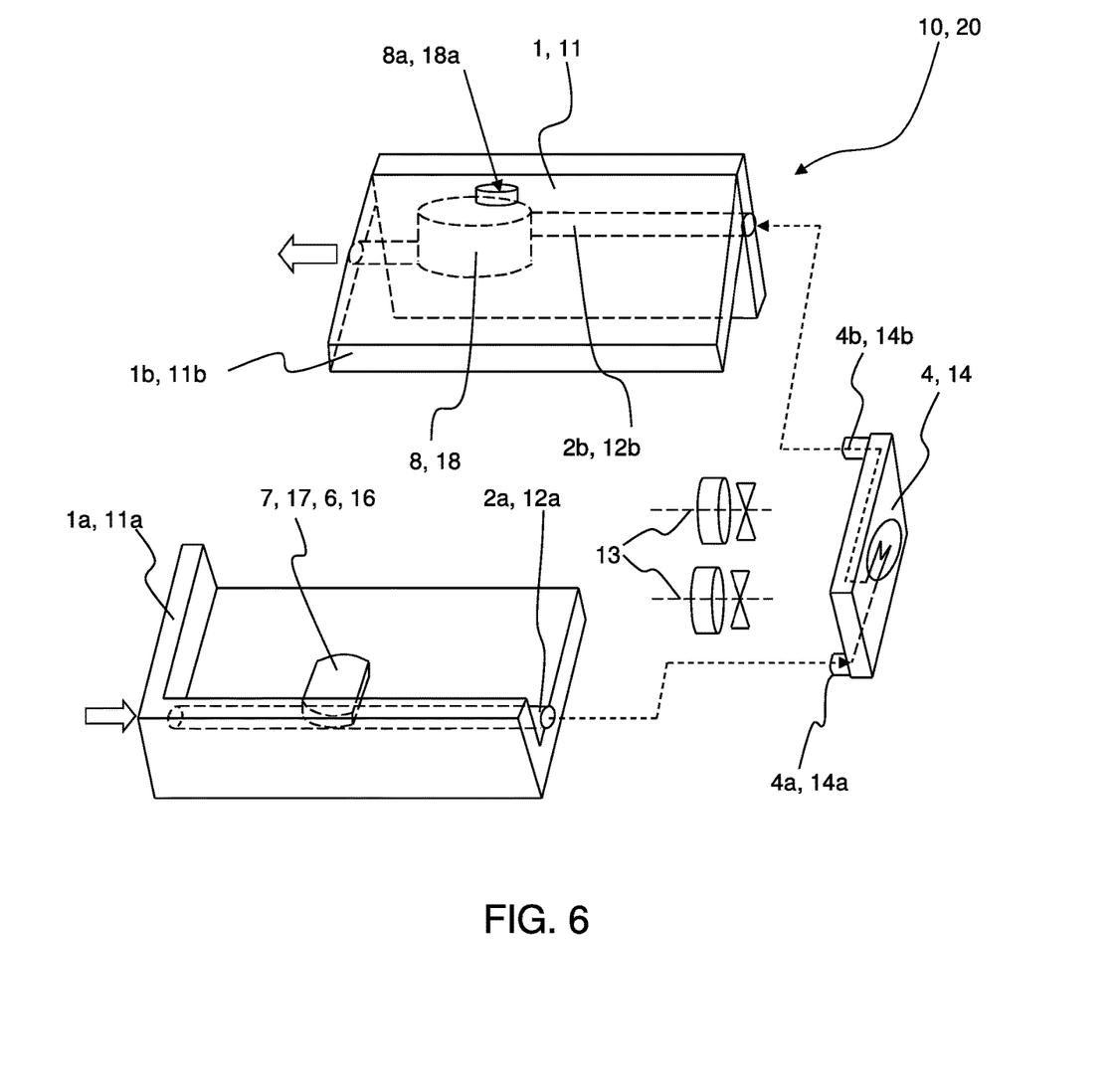
FIG. 6 illustrates a schematic representation depicting exploded view of a compact heat exchanger module configured by the housing depicted in FIG. 1-FIG. 5b and in accordance with an embodiment of the present invention.
Figure 7A:
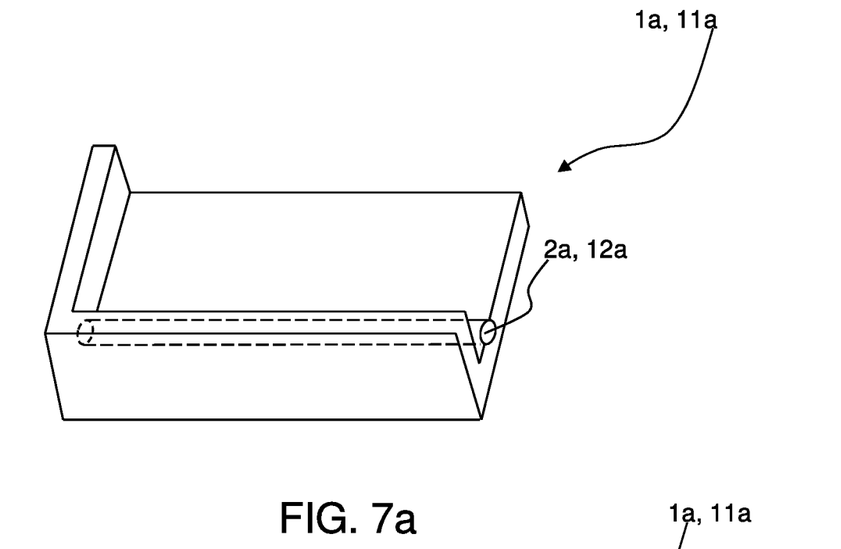
FIG. 7a illustrates a schematic representation of a straight fluid flow conduit in accordance with an embodiment of the present invention integrally configured on a wall of the housing, particularly first housing portion configuring the compact heat exchanger module of FIG. 6.

In accordance with an embodiment of the present invention as illustrated in FIG. 6, the housing 1 configuring a heat exchanger module 10, herein after referred to as "module" 10 further includes at least one of a fan mounting structure and a heat exchanger mounting structure integrally formed on at least one interior wall of the housing 1. The fan mounting structure facilitates mounting of fan elements 13 inside the housing 1, wherein the fan elements 13 facilitates air flow through the at least one heat exchanger 4 to enhance the heat exchange. The heat exchanger mounting structure facilitates mounting of the at least one heat exchanger 4 inside the housing 1. The housing 1 may also include battery mounting structure that facilitates mounting of battery inside the housing 1, wherein the battery powers the fan elements 13 and other auxiliary electric powered elements disposed inside the housing 1. The module 10 as disclosed above and illustrated in FIG. 6-FIG. 7b further includes at least one pump housing 6. The pump housing 6 is formed on at least one wall of the housing 1 and receives at least one pump 7 therein. Alternatively, the pump 7 is directly mounted on the housing 1. The at least one pump 7 received in the pump housing 6 or directly mounted on the housing 1 is connected to and is in fluid communication with at least one of the fluid flow conduits 2a and 2b to configure and regulate fluid flow through a heat exchange circuit of which the fluid flow conduits 2a and 2b are part of. Further, the "module" 10 includes at least one storage reservoir 8 formed on at least one wall of the housing 1. The at least one storage reservoir 8 is connected to and is in fluid communication with the fluid flow conduit other than the fluid flow conduit to which the at least one pump 7 is connected to either directly or through the pump housing 6. With such configuration delicate and critical elements such as the at least one heat exchanger 4, fluid flow conduits 2a and 2b, the fan elements 13, pump 7 and battery are all received inside the housing 1 and are protected against harmful environment conditions such as dust and moisture laden environment. In accordance to one embodiment, at least one of the fluid flow conduits 2a and 2b, the at least one pump housing 6 and at least one storage reservoir 8 are integrally configured on the internal walls of the housing 1.

In accordance with an embodiment of the present invention, the housing 1 is of plastic material. In accordance with another embodiment of the present invention, the housing 1 is of metal. However, the present invention is not limited to any particular configuration of the housing 1 and material of the housing 1 as far as at least one of the fluid flow conduits 2a and 2b, the pump housing 6 for receiving at least one pump 7 therein and the storage reservoir 8 are integrally configurable on the internal walls of the housing 1. In an embodiment, the at least one of the fluid flow conduits 2a, 2b, the pump 6 and the storage reservoir 8 are integrally formed on at least one internal wall of the housing 1.

Figure 1:
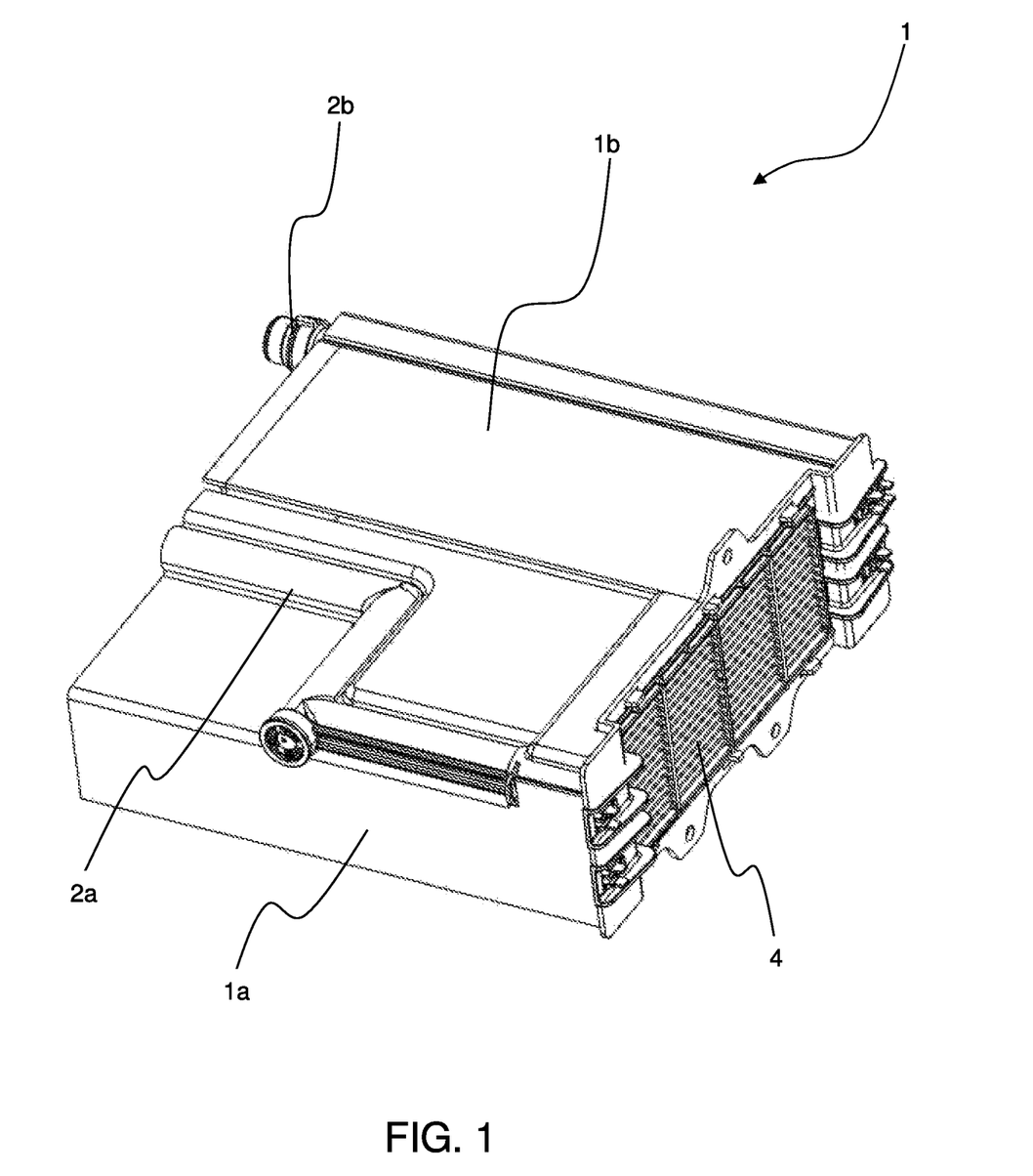
FIG. 1 illustrates an assembled view of housing in accordance with another embodiment of the present invention configuring a compact heat exchanger module, also referred to as "module"
Figure 2:
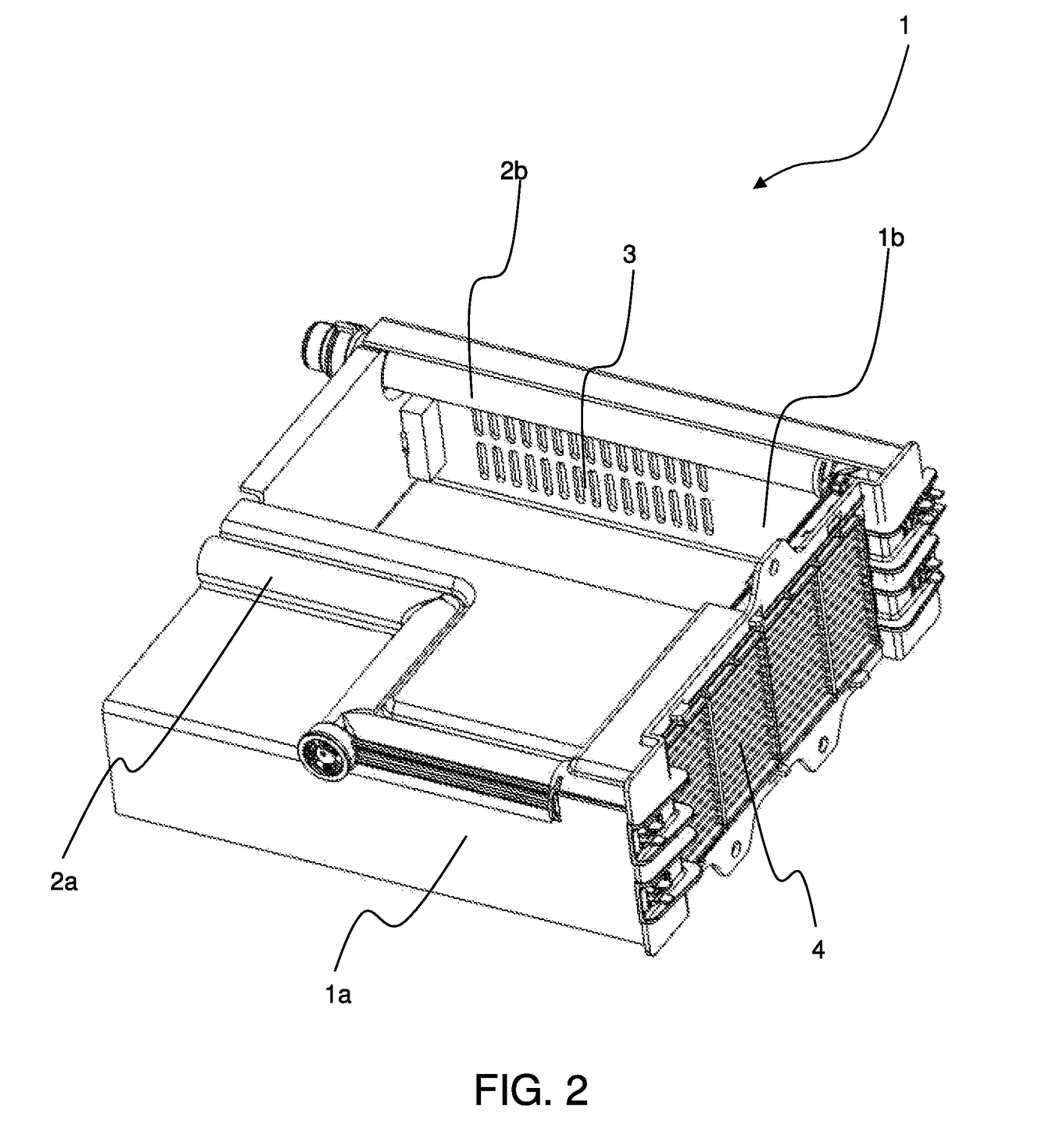
FIG. 2 illustrates another assembled view of the housing of FIG. 1 without a cover plate for depicting at least a portion of an interior of the housing.
Figure 3:
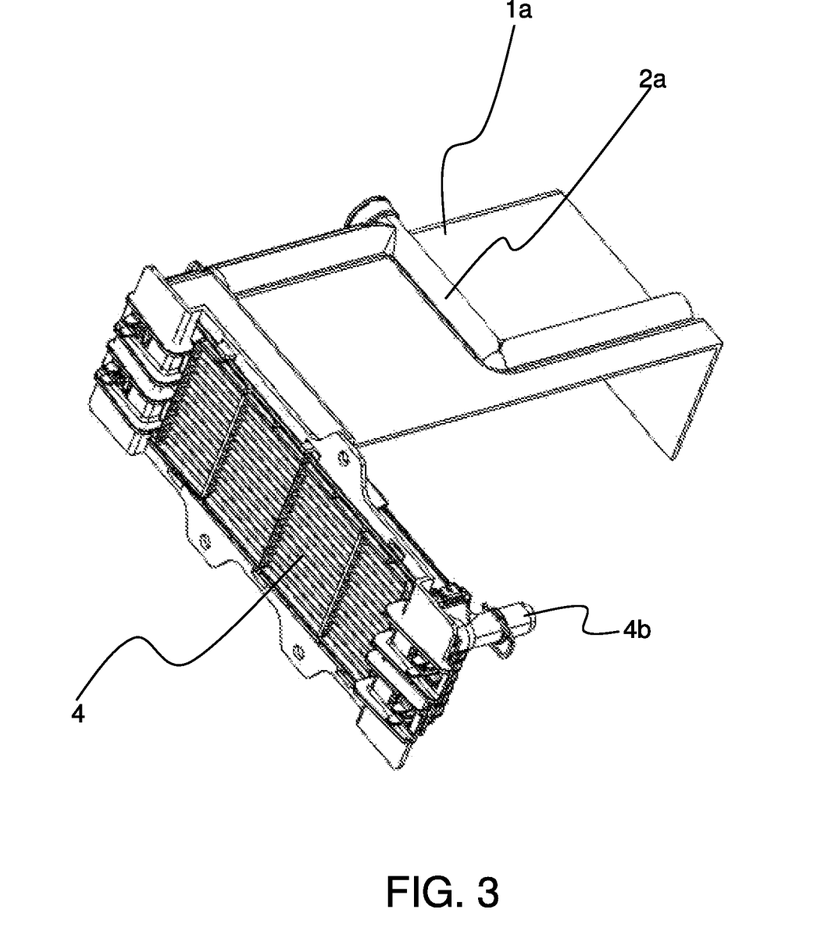
FIG. 3 illustrates a first housing portion of the housing of FIG. 1 with a first fluid flow conduit integrally formed thereon and connected to an inlet of a heat exchanger in accordance with an embodiment of the present invention.
Figure 4:
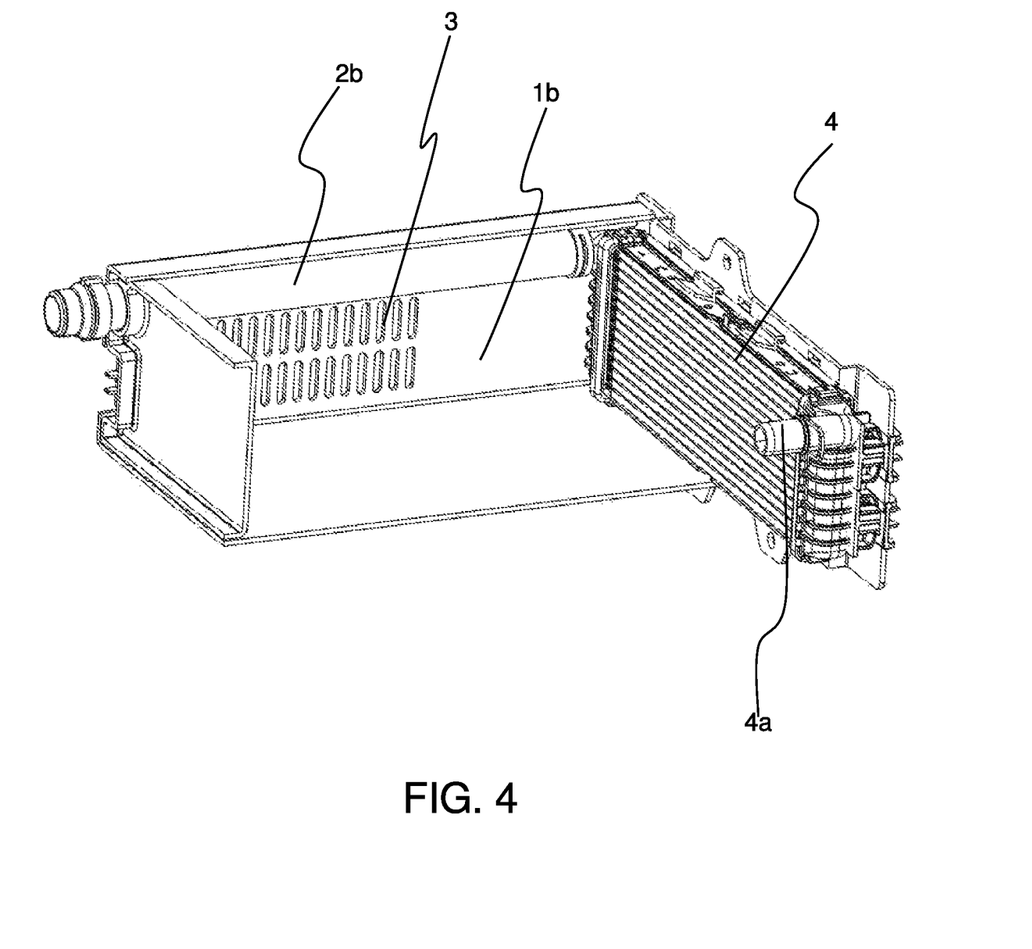
FIG. 4 illustrates a second housing portion of the housing of FIG. 1 with a second fluid flow conduit integrally formed thereon and connected to an outlet of the heat exchanger.
Figure 5A:
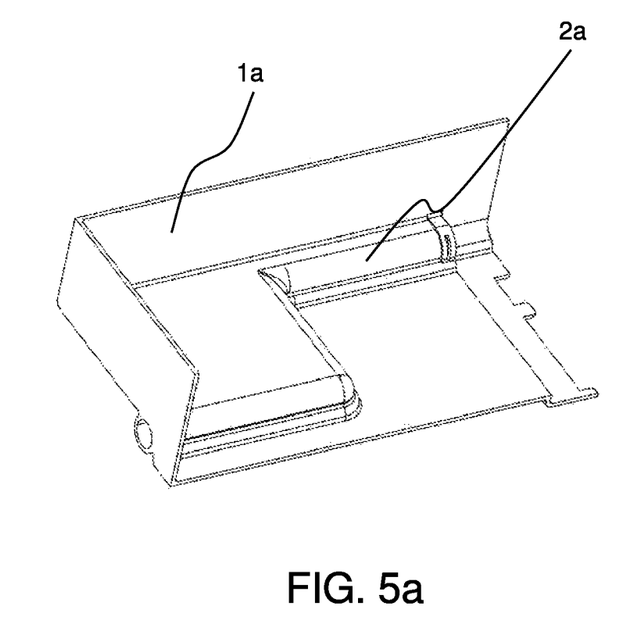
FIG. 5a and FIG. 5b illustrate the first housing portion and the second housing portion of the FIG. 3 and FIG. 4 respectively.
Figure 5B:
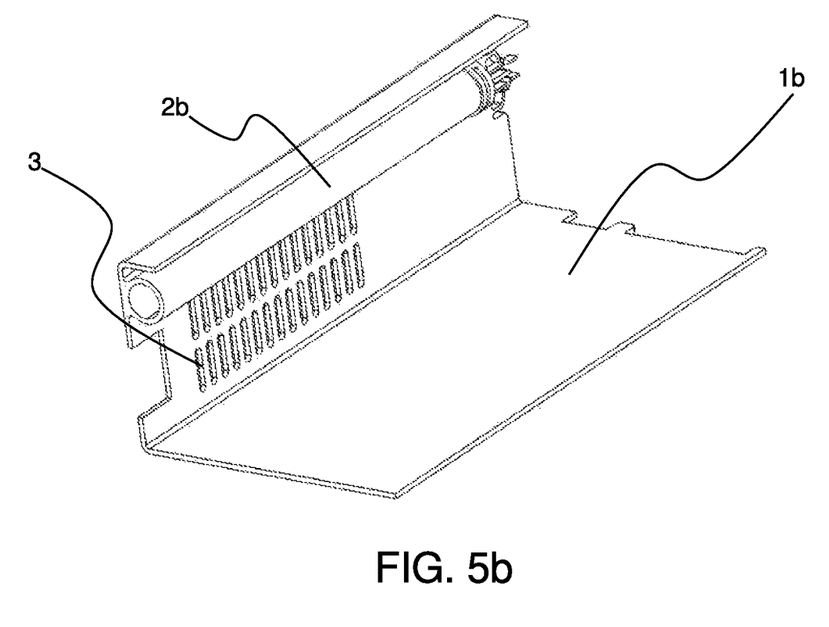
Figure 7B:
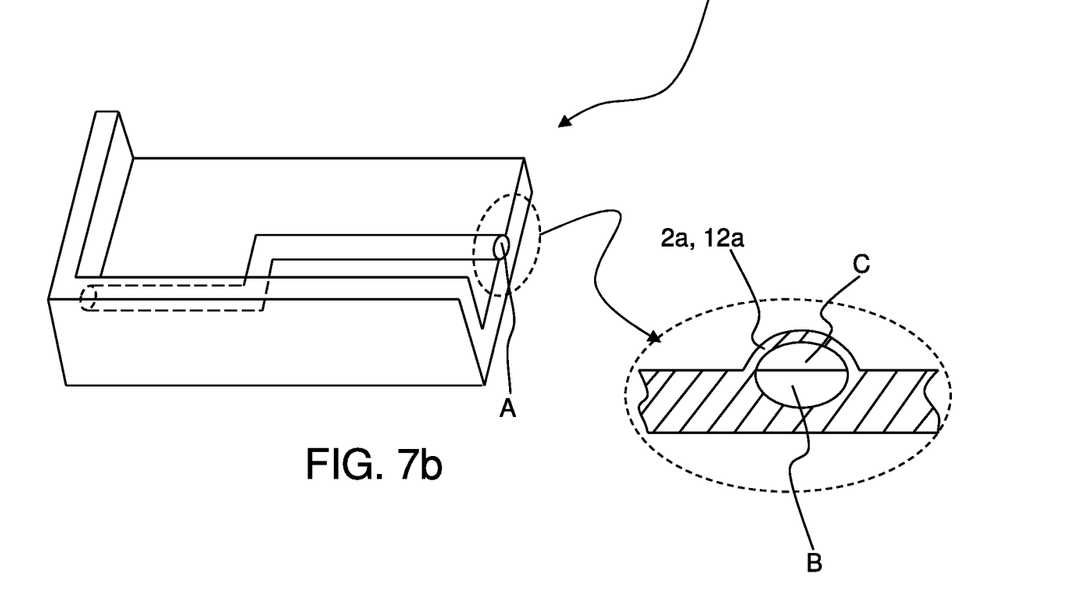
FIG. 7b illustrates a schematic representation of a fluid flow conduit with a right angle bend in accordance with another embodiment of the present invention integrally configured on a wall of the housing, particularly the first housing portion configuring the compact heat exchanger module of FIG. 6.

In accordance with an embodiment of the present invention, at least a portion of the fluid flow conduits 2a and 2b are integrally formed on at least one wall of the housing 1 or any available surface such as surface of auxiliary elements such as pressurized air flow bottles and storage reservoir received inside the housing 1. In accordance with an embodiment of the present invention and as illustrated in FIG. 5a and FIG. 7b, the fluid flow conduits 2a and 2b are so configured on the walls of the housing 1 that at least a portion "B" of cross section "A" of at least one of the fluid flow conduits 2a and 2b through which heat exchange fluid flows is within the walls of the housing 1 and the remaining portion "C" of cross section "A" of at least one of the fluid flow conduits 2a and 2b is outside the walls, specifically, over and above the interior walls of the housing 1. More specifically, only some portion of the fluid flow conduits 2a and 2b protrude from the walls of the housing 1 into the interior of the housing 1 while remaining portion of the fluid flow conduits 2a and 2b remain inside the walls of the housing 1, thereby resulting in better utilization of the space. With such configuration, the fluid flow conduits 2a and 2b are systematically configured along the walls of the housing 1 and achieve proper space utilization. Also, with such configuration, the fluid flow conduits 2a and 2b are held away from the fan elements 13 and heated surfaces or sharp edges that may damage the conduits 2a and 2b and cause leakage. Also with such configuration, the fluid flow conduits 2a and 2b do not interfere with operation of other elements such as the fan elements 13 that may also disposed inside the housing 1. Although, as per the figures, the fluid flow conduits 2a and 2b are illustrated as having a circular/elliptical cross section, however, the fluid flow conduits 2a and 2b of the present invention are not limited to circular/elliptical cross section and can have any cross section such as rectangle, square, etc.

The fluid flow conduits 2a and 2b are connected to the at least one inlet 4a and the at least one outlet 4b of the at least one heat exchanger 4 respectively. In accordance with an embodiment of the present invention, the fluid flow conduits 2a and 2b are integrally configured on the opposite walls of the housing 1. In accordance with an embodiment of the present invention, at least one of the fluid flow conduits 2a and 2b, the pump housing 6 receiving the pump 7 therein and the storage reservoir 8 are so arranged and integrally configured on walls of first housing portion 1a and the second housing portion 1b of the housing 1 that the fluid flow conduits 2a and 2b can interchangeably connect with the at least one inlet 4a and the at least one outlet 4b of the at least one heat exchanger 4, while the first housing portion 1a and the second housing portion 1b still can configure the assembled configuration of the housing 1. The separate fluid flow conduits 2a, 2b are configures at least a part of a heat exchange circuit to receive heat exchange fluid from the at least one heat exchanger 4 and deliver the heat exchange fluid to the at least one heat exchanger 4. More specifically, the fluid flow conduits 2a and 2b are part of the heat exchange circuit that facilitate passage of fluid cooled by the at least one heat exchanger 4 through at least one region to be cooled to extract heat there-from and return heated fluid back to the at least one heat exchanger 4 for cooling/re-cooling thereof. Specifically, at least one first fluid flow conduit 2a supplies fluid, that is either one of coolant, refrigerant and lubricant heated by extracting heat from the at least one region to be cooled, that is at least one of, for example, a battery, an electronic Control unit and Engine Control Unit (ECU), an evaporator of a Heating Ventilation and Air Conditioning system, an engine and transmission of a vehicle and the likes to the at least one heat exchanger 4 that is at least one of, for example, a chiller, a condenser, a radiator and the likes respectively. The at least one second flow conduit 2b separate from the first fluid flow conduit 2a returns fluid cooled in the at least one heat exchanger 4 back to the at least one region to be cooled. The cycle repeats to maintain the at least one region to be cooled within the desired temperature limits. The fluid flow conduits 2a and 2b configure part of fluid flow circuit of at least one of, a battery, an electronic control unit and Engine Control Unit cooling system, the Heating Ventilation and Air Conditioning system and an engine cooling system of the vehicle. In accordance with another embodiment, the fluid flow conduits 2a and 2b configure part of fluid flow circuit of an exhaust gas re-circulation cooling system.

In accordance with another embodiment of the present invention, the fluid flow conduits 2a and 2b are part of the heat exchange circuit that facilitates passage of fluid heated by the at least one heat exchanger 4 through at least one region to be heated to reject heat there-to and return cooled fluid back to the at least one heat exchanger 4 for heating/re-heating thereof. The at least one first fluid flow conduit 2a supplies fluid cooled after rejecting heat to the at least one region to be heated, that is at least one of, for example, the engine, the condenser of an Heating Ventilation and Air Conditioning system of a vehicle and the likes to the at least one heat exchanger 4 that is at least one of, for example, a heater, the evaporator and the likes respectively. The at least one second flow conduit 2b separate from the first fluid flow conduit 2a returns fluid heated in the at least one heat exchanger 4 back to the at least one region to be heated. The cycle repeats to maintain the at least one region to be heated within the desired temperature limits. The fluid flow conduits 2a and 2b configure part of fluid flow circuit of at least one of, an engine cold starting system and the Heating Ventilation and Air Conditioning system of the vehicle.

As the fluid flow conduits 2a and 2b are integrally formed on the walls of the housing 1, the fluid flow conduits 2a and 2b are also formed of the same material as that of the housing 1. In accordance with an embodiment of the present invention, the fluid flow conduits 2a and 2b are formed of metal to provide additional heat transfer surface. In accordance with another embodiment, the fluid flow conduits 2a and 2b are formed of plastic material. In accordance with still another embodiment of the present invention, the fluid flow conduits 2a and 2b are configured with auxiliary elements such as flow restrictors that retard the flow of heat exchange fluid through the fluid flow conduits 2a and 2b to enhance heat transfer there through. In accordance with still another embodiment of the present invention, the fluid flow conduits 2a and 2b are configured with end connectors that facilitate connection of the fluid flow conduits 2a and 2b with the pump 7 and the storage reservoir 8 respectively. Further, the fluid flow conduits 2a and 2b are configured with end connectors that facilitate connection between the fluid flow conduits 2a and 2b with the corresponding inlet 4a and the outlet 4b of the at least one heat exchanger 4.

In accordance with an embodiment of the present invention, the fluid flow conduits 2a and 2b either alone or along with at least one of the pump housing 6 and the storage reservoir 8 are integrally formed on the walls of the housing 1 by one step molding. Also, the connection between the fluid flow conduits 2a and 2b and at least one of the pump housing 6 and the storage reservoir 8 is also formed during the one step molding itself. More specifically, the pump 7 and pump housing 6 are already in fluid communication with each other, so when the connection between the fluid flow conduits 2a and 2b and the pump housing 6 is established during the molding process, the fluid communication between the pump 7 and the fluid flow conduits 2a and 2b is also established. With such configuration, the need for separate connectors for configuring connections between the storage reservoir 8 and the fluid flow conduits 2a and 2b and the pump housing 6 or pump 7 and the fluid flow conduits 2a and 2b is eliminated. Also, with such configuration the issues associated with connectors such as leakage and connector compatibility issues are also eliminated. Also, with such configuration, the dependency on dedicated tools for configuring connections between the storage reservoir 8 and the fluid flow conduits 2a and 2b and the pump housing 6 or the pump 7 and the fluid flow conduits 2a and 2b is eliminated, thereby reducing time required for assembling the heat exchanger module 10 and configuring the heat exchanger module 10 on the vehicle. Also, with such configuration of the heat exchanger module 10, the assembly of the heat exchanger module 10 is convenient, involves less time and is error proof.

In accordance with an embodiment of the present invention, the fluid flow conduits 2a and 2b are integrally formed on at least one wall of the housing 1 by either one of molding in a single step and extrusion process. Alternatively, the fluid flow conduits 2a and 2b are formed on at least one wall of the housing 1 by machining process. In accordance with an embodiment of the present invention, the fluid flow conduits 2a and 2b are straight conduits as illustrated in FIG. 7a. In accordance with an embodiment of the present invention, the fluid flow conduits 2a and 2b follow at least one of regular and irregular profile but still facilitate smooth unhindered flow there-through. In accordance with still another embodiment of the present invention, the fluid flow conduits 2a and 2b include at least one right angle bend as illustrated in FIG. 7b but still facilitate smooth unhindered flow there-through. Such configuration of fluid flow conduits 2a and 2b integrally formed on the walls of the housing 1 facilitates smooth and unhindered fluid flow there through irrespective of profile of the fluid flow conduits 2a and 2b, number and configuration of bends configured along the length of the fluid flow conduits 2a and 2b, while still using smaller pump and the storage reservoir 8. With such configuration of the fluid flow conduits 2a and 2b integrally formed on the walls of the housing 1, problems associated with use of flexible pipes in the conventional heat exchanger modules for connecting the heat exchanger 4, the pump 7 received in the pump housing 6 and the storage reservoir 8 of the heat exchanger module 10 are eliminated. Particularly, such configuration of the fluid flow conduits 2a and 2b addresses the problem of pressure loss in the fluid flowing through the pipes due to bends in the pipes, flexing of the pipes and routing of the pipes through constrained space in the vehicle. However, the present invention is not limited to any particular configuration, profile, cross-section, material and method of configuring the fluid flow conduits 2a and 2b on the walls of the housing 1 as far as the flow conduits 2a and 2b can be integrally formed on the walls of the housing 1.

The pump housing 6 and the storage reservoir 8 are formed on at least one wall of the housing 1. In accordance with an embodiment of the present invention, at least one of the pump housing 6 and the storage reservoir 8 are integrally formed on the walls of the housing 1, as such the pump housing 6 and the storage reservoir 8 are also formed of the same material as that of the housing 1. The pump 7 and the storage reservoir 8 are connected to and in fluid communication with different fluid flow conduits 2a and 2b respectively to configure and regulate fluid flow through the heat exchange circuit of which the fluid flow conduits 2a and 2b are part of. The storage reservoir 8 is capable of holding heat exchange fluid and in conjunction with the pump 7 is capable of ensuring continuous flow of the heat exchange fluid through the heat exchange circuit, whenever desired. The storage reservoir 8 further includes a filler element 8a configured thereon and extending out from the housing 1 such that the filler element 8a is accessible from outside the housing 1. The filler element 8a is closable by a cap that facilitates refilling of the storage reservoir 8 with heat exchange fluid when the heat exchange fluid level flowing through the heat exchange circuit declines due to leakage and other factors. The pump 7 is either one of centrifugal pump or positive displacement pump. However, considering the space limitations, either the positive displacement pumps or centrifugal pumps can be used. However, the present invention is not limited to any particular configuration, size, material and method of configuring the pump housing 6 and the storage reservoir 8, or any particular configuration of the pump 7 as far as these are capable of ensuring continuous flow of the heat exchange fluid through the heat exchange circuit, whenever desired.

A compact fluid processing module 20 is disclosed in accordance with an embodiment of the present invention and illustrated in FIG. 6 of the accompanying drawings. The compact fluid processing module 20 includes a housing 11, separate fluid flow conduits 12a and 12b and at least one pump 17. The housing 11 receives at least one fluid processing element 14 configured with at least one inlet 14a and the at least one outlet 14b. The separate fluid flow conduits 12a and 12b are integrally formed on opposite walls of the housing 11, particularly, the first and second housing portions 11a and 11b respectively and are interchangeably connectable to the at least one inlet 14a and the at least one outlet 14b of the at least one fluid processing element 14, while the first and second housing portions 11a and 11b still can configure the assembled configuration of the housing 11. The at least one pump housing 16 is formed on at least one wall of the housing 11 and receives at least one pump 17 therein. Alternatively, the pump 17 is directly mounted on the housing 11. The at least one pump 17 received in the pump housing 16 or directly mounted on the housing 11 is connected to and is in fluid communication with different fluid flow conduits 12a and 12b to configure and regulate fluid flow through a fluid processing circuit of which the fluid flow conduits 12a and 12b are part of. The compact fluid processing module 20 includes at least one storage reservoir 18 formed on at least one wall of the housing 11, the at least one storage reservoir 18 is connected to and is in fluid communication with the fluid flow conduit other than the fluid flow conduit to which the at least one pump 17 is connected to either directly or via the pump housing 16.

Generally, the fluid flow conduits 12a and 12b are part of the fluid processing circuit that facilitates passage of fluid processed by the at least one fluid processing element 14 through at least one target location and return the fluid that again requires processing back to the fluid processing element 14 for processing thereof. Specifically, the at least one fluid processing element 14 is for example, a filter element that filters lubricant passing there through and the fluid flow conduits 12a and 12b are part of a filtering circuit that facilitates supplying of particulate laden lubricant to the filter element for filtering thereof and returning filtered lubricant cleaned by the filter element to the at least one target location to be lubricated such as for example parts of an engine.

Again referring to FIG. 6 and the corresponding description, as the compact fluid processing module 20 is similar to the heat exchanger module 10 except that in case of the compact fluid processing module 20, the at least one fluid processing element 14 replaces the at least one heat exchanger 4 of the heat exchanger module 10, wherein the fluid processing element 14 can be either one of, for example, filter element, mixer and the likes and the fluid being processed in the at least one fluid processing element 14 is any fluid such as lubricant, Ad-blue, ethylene glycol and the likes used in vehicle instead of heat exchange fluid heated/cooled in the at least one heat exchanger 4 of the heat exchanger module 10. Every embodiment disclosed for the heat exchanger module 10 and the elements configuring the heat exchanger module 10 may also be applicable for the fluid processing module 20 and elements configuring the fluid processing module 20. However, for sake of brevity of present document, the heat exchanger module 10 and the elements configuring the heat exchanger module 10 are described in detail in the description of the current specification.

Several modifications and improvement might be applied by the person skilled in the art to the "module" as defined above, as long as it comprises housing, separate fluid conduits and at least one storage reservoir and at least one pump. The housing receives at least one heat exchanger configured with at least one inlet and at least one outlet. The separate fluid flow conduits are integrally formed on at least one wall of the housing and are connected to the at least one inlet and outlet of the at least one heat exchanger respectively. The at least one storage reservoir and pump are formed on at least one wall of the housing. The storage reservoir and the pump are connected to and in fluid communication with different fluid flow conduits to configure and regulate fluid flow through a heat exchange circuit of which the fluid flow conduits are part of.

In any case, the invention cannot and should not be limited to the embodiments specifically described in this document, as other embodiments might exist. The invention shall spread to any equivalent means and any technically operating combination of means.

What is claimed is:

1. A housing comprising:
   at least one heat exchanger; and
   a first fluid flow conduit and a second fluid flow conduit integrally formed on at least one wall thereof and configured to be connected to at least one inlet and at least one outlet of the at least one heat exchanger disposed within the housing,
   wherein the first fluid flow conduit configures a heat exchange circuit to receive heat exchange fluid from the at least one heat exchanger, and
   wherein the second fluid flow conduit configures the heat exchange circuit to deliver the heat exchange fluid to the at least one heat exchanger,
   wherein the housing is a modular housing such that at least one first housing portion and at least one second housing portion of the housing are configured to be detached from each other,
   wherein the first fluid flow conduit is integrally formed on the at least one first housing portion, and
   wherein the second fluid flow conduit is integrally formed on the at least one second housing portion.

2. The housing as claimed in claim 1, wherein the first fluid flow conduit and the second fluid flow conduit are configured to facilitate passage of heat exchange fluid cooled by the at least one heat exchanger through at least one region to be cooled to extract heat there-from and return heated fluid back to the at least one heat exchanger for cooling thereof.

3. The housing as claimed in claim 1,
   wherein the first fluid flow conduit supplies fluid selected from a group consisting of: coolant, refrigerant and lubricant, heated by extracting heat from at least one region to be cooled selected from a group consisting of: a battery, an electronic Control unit and Engine Control Unit (ECU), an evaporator of a Heating Ventilation and Air Conditioning system, and an engine and transmission of a vehicle, to the at least one heat exchanger that is at least one of: a chiller, a condenser and a radiator respectively,
   wherein the second fluid flow conduit separate from the first fluid flow conduit is adapted to return fluid cooled in the at least one heat exchanger back to the at least one region to be cooled, and
   wherein the first fluid flow conduit and the second fluid flow conduit configure part of a fluid flow circuit of at least one selected from a group consisting of: a battery, an electronic control unit and Engine Control Unit cooling system, the Heating Ventilation and Air Conditioning system, and an engine cooling system of the vehicle.

4. The housing as claimed in claim 1, wherein the first fluid flow conduit and the second fluid flow conduit are configured to facilitate passage of heat exchange fluid heated by the at least one heat exchanger through at least one region to be heated to reject heat there-to and return cooled heat exchange fluid back to the at least one heat exchanger for heating thereof.

5. The housing as claimed in claim 4,
   wherein at least one first fluid flow conduit is configured to supply fluid cooled by rejecting heat to the at least one region to be heated, selected from a group consisting of, an engine and a condenser of a Heating Ventilation and Air Conditioning system of a vehicle, to the at least one heat exchanger that is at least one of: a heater and an evaporator respectively,
   wherein the second fluid flow conduit separate from the first fluid flow conduit is configured to return fluid heated in the at least one heat exchanger back to the at least one region to be heated, and
   wherein the first fluid flow conduit and the second fluid flow conduit configure part of fluid flow circuit of at least one of: an engine cold starting system and the Heating Ventilation and Air Conditioning system of the vehicle.

6. The housing as claimed in claim 1, wherein at least a portion of cross section of at least one of the first fluid flow conduit and the second fluid flow conduit through which fluid flows is outside the walls of the housing.

7. The housing as claimed in claim 1, wherein the at least one heat exchanger is configured within the housing to facilitate air flow across the at least one heat exchanger, the housing further comprising:
   at least one of vents and exhaust air ducting configured on at least one wall of the housing for facilitating escape of air entering inside the housing after passing through the at least one heat exchanger.

8. A compact heat exchanger module comprising:
   a housing comprising:
      at least one heat exchanger, and
      a first fluid flow conduit and a second fluid flow conduit integrally formed on at least one wall thereof and configured to be connected to at least one inlet and at least one outlet of the at least one heat exchanger disposed within the housing,
      wherein the first fluid flow conduit configures a heat exchange circuit to receive heat exchange fluid from the at least one heat exchanger,
      wherein the second fluid flow conduit configures the heat exchange circuit to deliver the heat exchange fluid to the at least one heat exchanger,
      wherein the housing is a modular housing such that at least one first housing portion and at least one second housing portion of the housing are configured to be detached from each other,
      wherein the first fluid flow conduit is integrally formed on the at least one first housing portion, and
      wherein the second fluid flow conduit is integrally formed on the at least one second housing portion; and
   at least one pump configured to be connected to and in fluid communication with at least one of the first fluid flow conduit and the second fluid flow conduit to configure and regulate fluid flow through the heat exchange circuit of which the first fluid flow conduit and the second fluid flow conduit are part of.

9. The compact heat exchanger module as claimed in claim 8, further comprising: a pump housing integrally formed on at least one wall of the housing to receive the at least one pump therein.

10. The compact heat exchanger module as claimed in claim 8, further comprising: at least one storage reservoir formed on at least one wall of the housing, wherein the at least one storage reservoir is configured to be connected to and in fluid communication with the first fluid flow conduit or the second fluid flow conduit other than the first fluid flow conduit or the second fluid flow conduit to which the at least one pump is connected to.

11. A compact fluid processing module comprising:
   a housing comprising:
      at least one fluid processing element that is configured with at least one inlet and at least one outlet; and
      a first fluid flow conduit and a second fluid flow conduit integrally formed on at least one wall of the housing and configured to be connected to the at least one inlet and the at least one outlet of the at least one fluid processing element respectively,
      wherein the first fluid flow conduit configures a fluid processing circuit to receive fluid to be processed from the at least one fluid processing element
      wherein the second fluid flow conduit delivers the fluid to be processed to the at least one fluid processing element,
      wherein the housing is a modular housing such that at least one first housing portion and at least one second housing portion of the housing are configured to be detached from each other,
      wherein the first fluid flow conduit is integrally formed on the at least one first housing portion, and
      wherein the second fluid flow conduit is integrally formed on the at least one second housing portion; and
   at least one pump configured to be connected to and in fluid communication with at least one of the first fluid flow conduit and the second fluid flow conduit to configure and regulate fluid flow through the fluid processing circuit of which the first fluid flow conduit and the second fluid flow conduit are part of.

12. The compact fluid processing module as claimed in claim 11, further comprising: a pump housing integrally formed on at least one wall of the housing to receive the at least one pump therein.

13. The compact fluid processing module as claimed in claim 11, further comprising at least one storage reservoir formed on at least one wall of the housing, the at least one storage reservoir is adapted to be connected to and is in fluid communication with the first fluid flow conduit or the second fluid flow conduit other than the first fluid flow conduit or the second fluid flow conduit to which the at least one pump is connected to.

14. The compact fluid processing module as claimed in claim 11, wherein the at least one fluid processing element is a filter element adapted to filter lubricant passing there through and the first fluid flow conduit and the second fluid flow conduit are part of a filtering circuit adapted to facilitate supply of particulate laden lubricant to the filter element for filtering thereof and returning filtered lubricant cleaned by the filter element to at least one target location to be lubricated such as parts of an engine.

\* \* \* \* \*